US010856213B2

(12) United States Patent
Fitch et al.

(10) Patent No.: US 10,856,213 B2
(45) Date of Patent: Dec. 1, 2020

(54) CONNECTING AN UE TO A BASESTATION, WITH A QUALITY OF SERVICE AND AN ALLOWED CSG SERVICE PRIORITY

(71) Applicant: British Telecommunications Public Limited Company, London (GB)

(72) Inventors: Michael Fitch, London (GB); Richard MacKenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/516,765

(22) PCT Filed: Nov. 13, 2015

(86) PCT No.: PCT/EP2015/076524
§ 371 (c)(1),
(2) Date: Apr. 4, 2017

(87) PCT Pub. No.: WO2016/079016
PCT Pub. Date: May 26, 2016

(65) Prior Publication Data
US 2017/0303188 A1 Oct. 19, 2017

(30) Foreign Application Priority Data
Nov. 20, 2014 (EP) .................................. 14194204

(51) Int. Cl.
*H04W 48/02* (2009.01)
*H04W 48/16* (2009.01)
(Continued)

(52) U.S. Cl.
CPC ....... *H04W 48/16* (2013.01); *H04W 36/0061* (2013.01); *H04W 36/0094* (2013.01); *H04W 48/20* (2013.01); *H04W 84/045* (2013.01)

(58) Field of Classification Search
CPC .............. H04W 4/08; H04W 36/0061; H04W 36/0055; H04W 4/06; H04W 76/021;
(Continued)

(56) References Cited

U.S. PATENT DOCUMENTS 8,437,743 B2 * 5/2013 Olsson .................. H04W 8/186
455/411
8,553,616 B2 * 10/2013 Tiwari .................. H04W 48/16
370/328
(Continued)

FOREIGN PATENT DOCUMENTS

CN 105611554 A 5/2016
EP 2 154 917 A1 2/2010
(Continued)

OTHER PUBLICATIONS

Application and Filing Receipt for U.S. Appl. No. 15/553,708, filed Aug. 25, 2017, Inventors: Fitch et al.
(Continued)

*Primary Examiner* — William D Cumming
(74) *Attorney, Agent, or Firm* — Patterson Thuente Pedersen, P.A.

(57) ABSTRACT

The disclosure includes a method in a cellular communications network, and a User Equipment, basestation and network management entity for implementing the method, the method comprising: a first basestation transmitting a first message including a Closed Subscriber Group (CSG) identifier; determining, for a User Equipment (UE) whether the CSG identifier is present on a first allowed CSG list; determining the allowed service level for the UE, the allowed service level indicating one of at least a first and second allowed service level; and connecting the UE to the first basestation if the CSG identifier is present on the first
(Continued)

allowed CSG list, wherein the Quality of Service (QoS) for the UE is dependent on the allowed service level.

7 Claims, 8 Drawing Sheets

(51) Int. Cl.
| | |
|---|---|
| H04W 4/08 | (2009.01) |
| H04W 24/10 | (2009.01) |
| H04W 36/08 | (2009.01) |
| H04W 12/08 | (2009.01) |
| H04W 36/00 | (2009.01) |
| H04W 48/20 | (2009.01) |
| H04W 84/04 | (2009.01) |

(58) Field of Classification Search
CPC . H04W 48/16; H04W 36/0083; H04W 48/08; H04W 8/20; H04W 48/02; H04W 36/00835; H04W 8/18; H04W 24/10; H04W 52/244; H04W 8/186; H04W 12/08
USPC .... 455/423.3, 434, 438, 450, 410, 411, 436, 455/517; 370/328, 310, 252, 332
See application file for complete search history.

(56) References Cited

U.S. PATENT DOCUMENTS

| | | | | |
|---|---|---|---|---|
| 8,588,773 | B2* | 11/2013 | Deshpande | H04J 11/0093 455/434 |
| 8,873,440 | B2* | 10/2014 | Singh | H04W 36/0083 370/310 |
| 8,903,402 | B2* | 12/2014 | Guo | H04W 36/0055 370/331 |
| 9,215,629 | B2* | 12/2015 | Hapsari | H04W 36/0038 |
| 9,301,105 | B2* | 3/2016 | Kim | H04W 72/10 |
| 9,392,420 | B2* | 7/2016 | Fodor | H04W 4/08 |
| 9,439,137 | B2* | 9/2016 | Kim | H04W 76/021 |
| 9,872,170 | B2* | 1/2018 | Kim | H04W 48/08 |
| 10,462,712 | B2* | 10/2019 | Jha | H04L 5/0094 |
| 2009/0305699 | A1* | 12/2009 | Deshpande | H04W 48/02 455/434 |
| 2010/0120447 | A1 | 5/2010 | Anderson et al. | |
| 2010/0130189 | A1 | 5/2010 | Morrison et al. | |
| 2010/0157911 | A1 | 6/2010 | Hedge et al. | |
| 2010/0178912 | A1 | 7/2010 | Gunnarsson et al. | |
| 2011/0069658 | A1* | 3/2011 | Tiwari | H04W 48/16 370/328 |
| 2011/0143806 | A1 | 6/2011 | Song et al. | |
| 2011/0170481 | A1* | 7/2011 | Gomes | H04W 36/00835 370/328 |
| 2011/0190027 | A1 | 8/2011 | Michel et al. | |
| 2011/0274030 | A1 | 11/2011 | Wang et al. | |
| 2011/0274051 | A1* | 11/2011 | Vikberg | H04W 8/18 370/328 |
| 2012/0002537 | A1 | 1/2012 | Bao et al. | |
| 2012/0026865 | A1 | 2/2012 | Fan et al. | |
| 2012/0122422 | A1* | 5/2012 | Olsson | H04W 4/08 455/410 |
| 2012/0157095 | A1* | 6/2012 | Fodor | H04W 4/08 455/434 |
| 2012/0188884 | A1 | 7/2012 | Simonsson et al. | |
| 2012/0236828 | A1* | 9/2012 | Hapsari | H04W 36/0061 370/331 |
| 2012/0244903 | A1* | 9/2012 | Fong | H04W 24/10 455/517 |
| 2012/0257495 | A1 | 10/2012 | Schwarz et al. | |
| 2012/0264418 | A1 | 10/2012 | Lee et al. | |
| 2012/0275315 | A1 | 11/2012 | Schlangen et al. | |
| 2013/0005340 | A1 | 1/2013 | Drazynski et al. | |
| 2013/0035033 | A1 | 2/2013 | Sanneck et al. | |
| 2013/0039194 | A1* | 2/2013 | Siomina | H04W 52/244 370/252 |
| 2013/0084873 | A1 | 4/2013 | Sharony et al. | |
| 2013/0089076 | A1* | 4/2013 | Olvera-Hernandez | H04W 36/08 370/332 |
| 2013/0115914 | A1* | 5/2013 | Zhou | H04W 12/08 455/410 |
| 2013/0170435 | A1 | 7/2013 | Dinan | |
| 2013/0176874 | A1 | 7/2013 | Xu et al. | |
| 2013/0229931 | A1* | 9/2013 | Kim | H04L 5/0053 370/252 |
| 2013/0260768 | A1* | 10/2013 | Guo | H04W 36/0055 455/438 |
| 2014/0031041 | A1* | 1/2014 | Jung | H04W 36/30 455/437 |
| 2014/0038593 | A1* | 2/2014 | Kim | H04W 48/08 455/432.3 |
| 2014/0071891 | A1 | 3/2014 | Zhou et al. | |
| 2014/0092765 | A1 | 4/2014 | Agarwal et al. | |
| 2014/0187236 | A1 | 7/2014 | Chaing et al. | |
| 2014/0187246 | A1* | 7/2014 | Jha | H04L 5/001 455/436 |
| 2014/0269547 | A1 | 9/2014 | Valliappan et al. | |
| 2015/0004975 | A1 | 1/2015 | Yamamoto et al. | |
| 2015/0063136 | A1 | 3/2015 | Shen et al. | |
| 2015/0092552 | A1 | 4/2015 | Bajj et al. | |
| 2015/0131524 | A1 | 5/2015 | Cavalcante et al. | |
| 2015/0271714 | A1 | 9/2015 | Shetigar et al. | |
| 2015/0358940 | A1* | 12/2015 | Zhang | H04W 4/06 370/312 |
| 2016/0177676 | A1* | 6/2016 | Lynch | E21B 41/0035 405/285 |
| 2016/0192177 | A1* | 6/2016 | Kim | H04M 15/66 455/450 |
| 2017/0055186 | A1 | 2/2017 | Donepudi et al. | |
| 2017/0086181 | A1 | 3/2017 | Briggs et al. | |
| 2017/0303188 | A1* | 10/2017 | Fitch | H04W 48/20 |
| 2018/0054840 | A1 | 2/2018 | Fitch et al. | |
| 2018/0262922 | A1 | 9/2018 | MacKenzie et al. | |
| 2019/0014478 | A1 | 1/2019 | Mackenzie et al. | |
| 2020/0084710 | A1* | 3/2020 | Fitch | H04W 48/20 |

FOREIGN PATENT DOCUMENTS

| | | | |
|---|---|---|---|
| EP | 2 271 142 A1 | 1/2011 | |
| EP | 2 814 279 A1 | 12/2014 | |
| WO | WO 2009/022976 A1 | 2/2009 | |
| WO | WO 2010/024743 A1 | 3/2010 | |
| WO | WO 2011/028158 A1 | 3/2011 | |
| WO | WO 2011/056023 A2 | 5/2011 | |
| WO | WO 2012/138125 A2 | 10/2012 | |
| WO | WO 2013/071813 A1 | 5/2013 | |
| WO | WO 2015/034775 A1 | 3/2015 | |
| WO | WO 2016079016 A1 * | 5/2016 | ............ H04W 48/16 |
| WO | WO 2016/146328 A1 | 9/2016 | |
| WO | WO 2017/121606 A1 | 7/2017 | |
| WO | WO 2017/148752 A1 | 9/2017 | |
| WO | WO 2017/157585 A1 | 9/2017 | |

OTHER PUBLICATIONS

Application and Filing Receipt for U.S. Appl. No. 15/762,022, filed Mar. 21, 2016, Inventor(s): MacKenzie et al.
EP Priority Application No. 17180358.8, filed Jul. 7, 2017; 26 pages.
Application and Filing Receipt for U.S. Appl. No. 16/082,870, filed Sep. 6, 2018, Inventor(s): MacKenzie et al.
Application and Filing Receipt for U.S. Appl. No. 16/079,327, filed Aug. 23, 2018, Inventor(s): Briggs et al.
EP Search Report for EP Application No. 15187067.2; dated Mar. 18, 2016; 8 pages.
GB Examination Report for GB Application No. 1517069.9; dated Jan. 31, 2018; 3 pages.
GB Search Report for GB Application No. 1517069.9; dated Mar. 7, 2016; 4 pages.

(56) References Cited

OTHER PUBLICATIONS

International Preliminary Report on Patentability for PCT Application No. PCT/EP2016/069745, completed Oct. 20, 2017, 14 pages.
International Search Report and Written Opinion of the International Searching Authority for PCT Application No. PCT/EP2016/069745, dated Nov. 11, 2016, 11 pages.
Qualcomm Technologies, Inc,; "LTE Small Cell SON Test Cases Functionality and Interworking"; Jun. 5, 2015; Qualcomm Technologies, Inc. 5775 Morehouse Drive San Diego, CA 92121 U.S.A.; 82 pages.
Wu et al., Hai Jiang Yi; "Physical Cell Identity Self-Organization for Home eNodeB Deployment in LTE"; Nokia Siemens Networks; 978-1-4244-3709-2/10; 2010 IEEE; Beijing China; 6 pages.
Application and Filing Receipt for U.S. Appl. No. 16/023,917, filed Jun. 29, 2018, Inventor(s): MacKenzie et al.
Extended European Search Report for EP Application No. 19194204.5 dated Jul. 23, 2015; 7 pages.
International Search Report and Written Opinion of PCT Application No. PCT/EP2015/076524 dated Dec. 21, 2015; 11 pages.
International Preliminary Report on Patentability for PCT Application No. PCT/EP2015/076524 dated Mar. 7, 2017; 11 pages.
International Preliminary Report on Patentability for International Application No. PCT/EP2017/053957 report dated Sep. 4, 2018; 6 pages.
International Search Report & Written Opinion for PCT Application No. PCT/EP2016/053286 dated Apr. 11, 2016; 11 pages.
International Preliminary Report on Patentability for PCT Application No. PCT/EP2016/053286 report completed on Feb. 6, 2017; 13 pages.
Extended European Search Report for EP Application No. 15275077.4 dated Sep. 4, 2015; 8 pages.
Codan Radio, "RF Link Controlled Base Station," Codan Radio Communications https://www.codanradio.com/nroduct/rf-link-controlled-base/ [retrieved on Oct. 3, 2018]; 2 pages.
3 Generation Partnership Project, "3GPP 36.420 v8.0.0 Technical Specification; X2 general aspects and principals (Release 8)," (Dec. 2007) http://wvvw.mc.ioi3GPP/Specs/36420-800.pdf; [retrieved on Oct. 3, 2018]; 11 pages.
Carlson et al., "Scheduling to Minimize Interaction Cost"; The Johns Hopkins University, Baltimore, Maryland; Jun. 2, 1965; 8 pages.
Ning et al., "Fuzzy layered physical cell identities assignment in heterogeneous and small cell networks"; Electronics Letters May 12, 2016, vol. 52 No. 10, pp. 879-881; 2 pages.
European Search Report for EP Application No. 17180358.8; dated Jan. 31, 2018; 5 pages.
GB Search and Examination Report for GB Application No. GB 1710989.3; dated Dec. 1, 2017; 5 pages.
International Search Report and Written Opinion for PCT Application No. PCT/EP2017/053957 dated May 23, 2017; 11 pages.
European Search Report for EP Application No. 16158665.6 dated Sep. 13, 2016; 6 pages.
GB Combined Search and Examination Report for GB Application No. GB1603748.3; dated Aug. 26, 2016; 6 pages.
Mukhopadhyay et al.; "Novel RSSI Evaluation Models for Accurate Indoor Localization with Sensor Networks"; 978-1-4799-2361-8/14; 2014 IEEE; Bharti School of Telecommunication Technology and Management ITT Delhi Hauz Khas, New Delhi; 6 pages.
3rd Generation Partnership Project; Technical Specification Group Radio Access Network; Evolved Universal Terrestrial Radio Access (E-UTRA); Radio Frequency (RF) system scenarios (Release 9) 3GPP TR 36.942 V9.3.0 (Jun. 2012); 83 pages.
MacQueen, J. "Some Methods for Classification and Analysis of Multivariate Observations"; Fifth Berkeley Symposium; University of California, Los Angeles (1967). pp. 281-297 (17 pages total).
NGNM the engine of broadband wireless innovation "Recommended Practices for multi-vendor SON deployment" Deliverable D2 Version 1.0 by NGNM Alliance; Reading Bridge House George Street Reading Berkshire RG 1 8LS UK; Jan. 28, 2014; 30 pages.
Small Cell Forum Release 9.0; Document I76.09.01 LTE small cell SON test cases: Functionality and interworking; version 76.09.01; Feb. 21, 2017; 95 pages.
Fairbrother et al., "A Two-Level Graph Partitioning Problem Arising in Mobile Wireless Communications"; arXiv: 1705.08773v1 [math.OC] May 24, 2017; 23 pages.
Web article, "DSDP", NEOS Interfaces to DSDP http://www.mcs.anl.gov/DSDP; retrieved Jul. 3, 2017; 4 pages.
Web article, "Welcome to CVXPY" Welcome to CVXPY—CVXPY 0.4.9 documentation, retrieved Jul. 3, 2017; http://www.cvxpy.org/en/latest; 1 page.
Ghaddar et al., "A branch-and-cut algorithm based on semidefinite programming for the minimum k-parition problem"; Ann Oper Res DOI 10 1007/s10479-008-0481-4; Springer Science+Business Media, LLC 2008; Published online Dec. 3, 2008; 20 pages.
Rendl, F., "Semidefinite Relaxations for Partitioning, Assignment and Ordering Problems"; Cross Mark, Ann Oper Res (2016) 240 119-140 DOI 10 1007/s10479-015-2015-1; Published online Sep. 15, 2015; Springer Science+Business Media New York 2015; 22 pages.
International Preliminary Report on Patentability for PCT Application No. PCT/EP2017/052738; completed on Jun. 22, 2018; 27 pages.
International Search Report and Written Opinion for PCT Application No. PCT/EP2017/052738 dated Mar. 27, 2017; 20 pages.
European Search Report for EP Application No. 16160809.6 dated Sep. 26, 2016; 14 pages.
UK Examination Report for GB Patent Application No. GB1604515.5, dated May 11, 2017, 1 pages.
UK Examination Report for corresponding GB Patent Application No. GB1604515.5, dated Jan. 31, 2018, 3 pages.
UK Intention to Grant for corresponding GB Patent Application No. GB1604515.5, dated May 11, 2018, 2 pages.
UK Combined Search and Examination Report for corresponding GB Patent Application No. GB1604515.5, dated Sep. 9, 2016, 3 pages.
Younis, et al.; Military Communications; "Cognitive MANET Design for Mission-Critical Networks", IEEE Communications Magazine, Oct. 2009; 0163-6804/09 2009 IEEE; 5 pages.
$3^{rd}$ Generation Partnership Project; Technical Specification Group Services and System Aspects; Telecommunication Management; "Study on Management of Evolved Universal Terrestrial Radio Access Network (E-UTRAN) and Evolved Packet Core (EPC)"; Release 8 3GPP TR 32.816 V8.0.0 (Dec. 2008) Technical Report; Valbonne—France; 38 pages.
Extended European Search Report for corresponding EP Application No. 14194204.5 dated Jul. 23, 2015; 7 pages.
International Search Report for corresponding International Application No. PCT/US2015/076524 dated Dec. 21, 2015; 4 pages.
Written Opinion of the International Searching Authority for corresponding International Application No. PCT/US2015/076524 dated Dec. 21, 2015; 7 pages.
Written Opinion of the International Preliminary Examining Authority for corresponding International Application No. PCT/US2015/076524 dated Nov. 4, 2016; 8 pages.
International Preliminary Report on Patentability from the International Preliminary Examining Authority for corresponding International Application No. PCT/US2015/076524 dated Mar. 7, 2017; 12 pages.
Motorola et al., "Draft CR capturing HeNB inbound mobility agreements," 3GPP Draft; R2-096401 CR HENB 36_300 Agreements_V7, $3^{rd}$ Generation Partnership Project (3GPP), Jeju, Korea (Nov. 9, 2009); 4 pages. XP050391033.
Qualcomm Europe, "QoS support for hybrid CSG cells," 3GPP Draft; R3-091454, $3^{rd}$ Generation Partnership Project (3GPP), San Francisco, US (May 4, 2009); 3 pages. XP050341776.
Qualcomm Europe et al., "QoS principles for CSG members and non-members at hybrid access mode HeNBs," 3GPP Draft; R3-091022, $3^{rd}$ Generation Partnership Project (3GPP), San Francisco, US (Apr. 29, 2009); 4 pages. XP050341407.

* cited by examiner

CONNECTING AN UE TO A BASESTATION, WITH A QUALITY OF SERVICE AND AN ALLOWED CSG SERVICE PRIORITY

CROSS-REFERENCE TO RELATED APPLICATIONS

The present application is a National Phase entry of PCT Application No. PCT/EP2015/076524, filed on 13 Nov. 2015, which claims priority to EP Patent Application No. 14194204.5, filed on 20 Nov. 2014, which are hereby fully incorporated herein by reference.

TECHNICAL FIELD

The present disclosure relates to cellular communications network. In particular, but not exclusively, this disclosure relates to a Closed Subscriber Group (CSG) and hybrid basestation of a cellular communications network.

BACKGROUND

Cellular communications networks, such as the $4^{th}$ Generation (4G) Long Term Evolution (LTE) cellular network, provide a Closed Subscriber Group (CSG) mode for basestation operation. This is an access control technology that allows a User Equipment (UE) or group of UEs to connect to a particular basestation, but exclude access to all other UEs. This is particularly relevant for small cells (often called Home eNodeBs or femtocells), which typically provides radio access only to UEs associated with one or more end-users (but could also apply to picocells or macrocells). Accordingly, basestations initially operated in "closed" or "open" mode, wherein closed mode only provided access to particular UEs, whilst open mode provided access to any UE (i.e. access was publically available).

This concept was soon developed to allow a third mode of operation, namely 'hybrid' mode. When in hybrid mode, the basestation provided access to any UE, but gave prioritized access and improved Quality of Service (QoS) to a subset of UEs. This allowed Network Operators to improve their coverage area by mass deployment of small cells, whilst still providing exceptional QoS to the UEs associated with each small cell customer.

A brief overview of the handover procedure of a UE from a non-CSG basestation (which may be another small cell or a macrocell) to a CSG or hybrid basestation will now be described. Initially, the UE performs an autonomous neighbor cell search procedure, which determines whether the UE is either entering or leaving the coverage area of a CSG or hybrid basestation. This is determined by the UE comparing a CSG identifier (CSG-ID), which is broadcast by the non-CSG basestation, to a list of CSG-IDs contained on an allowed CSG list (the "whitelist") stored on the Universal Subscriber Identifier Module (USIM). If the UE detects that it is in the proximity of a CSG or hybrid basestation, it sends a proximity indicator message to its serving non-CSG basestation.

On receipt, the serving non-CSG basestation configures the UE to perform measurements on the "target" basestation using an RRC Connection Reconfiguration message. Accordingly, the UE acquires the PCI and various other parameters regarding the target basestation and reports it back to the serving non-CSG basestation. The serving non-CSG basestation can then determine whether the target basestation fulfils the usual criteria for a handover to take place.

Following this step, and assuming the serving non-CSG basestation determines that the handover can take place, the serving non-CSG basestation typically instructs the UE to acquire the System Information broadcast by the target basestation. Thus, the UE sends a further report to the serving non-CSG basestation, including the CSG identifier (CSG-ID) of the target basestation (which identifies the particular CSG), the CSG membership status (indicating whether the UE is a member of the CSG or not, determined by consultation of the whitelist), the CSG indicator (either TRUE or FALSE, depending on whether the target basestation is a CSG basestation or hybrid basestation respectively) and further identification information for the target basestation (which can include the unique Global Cell Identifier and Tracking Area Code).

To further ensure that access to the target CSG cell is only permitted for UEs with the correct access rights, the serving non-CSG basestation sends a message to the network's Mobility Management Entity (MME) requesting handover of the UE to the target basestation. The MME checks with the Home Subscriber Server (HSS) and with the policy server to determine the type of service and billing information needed. If the target basestation is operating in closed mode (the serving non-CSG basestation determines that the target basestation is operating in closed mode as the CSG indicator is set to TRUE), the message includes the CSG-ID, and the Global Cell Identifier of the target basestation. The MME contains a database of whitelists for each UE, wherein each UE is identified by its IMSI. Accordingly, the MME can retrieve the whitelist for the UE using the IMSI in the measurement report, which corresponds to the whitelist stored on the UE (both are updated by the network's HSS). Thus, on receipt of the message from the serving non-CSG basestation, the MME is able to verify that the UE is allowed to connect to the target basestation by retrieving the whitelist for that UE and confirming that the CSG-ID is present. Once verified, the MME sends a handover request message to the target basestation, including the CSG-ID in the message. On receipt, the target basestation sends an RRC Connection Reconfiguration message to the UE via the serving non-CSG basestation, which allows the UE to connect to the target basestation.

For target basestations operating in hybrid mode (which provide access to all UEs, but prioritized access and QoS to a subset of UEs), the handover process described above slightly differs. Once the serving non-CSG basestation receives the measurement report including the additional information (i.e. the CSG ID, the CSG member status, CSG indicator, Global Cell Identifier and Tracking Area Code) from the UE, the serving non-CSG basestation sends a message to the MME requesting handover to the target basestation which further includes a cell access mode of the target basestation. The serving non-CSG basestation determines that the cell access mode of the target basestation is hybrid due to the provision of the CSG-ID but the CSG indicator being set to FALSE. This cell access mode indicates to the MME that the target basestation is operating in hybrid mode. The MME verifies that the UE is allowed to connect to the target basestation by comparing the CSG-ID to its local copy of the UE's whitelist (and thus confirms whether the UE is a member of the CSG), and sends a handover request message to the target basestation indicating the UE's CSG membership information. The target basestation then determines whether the UE is allowed CSG access or only public level access using the CSG membership information from the MME. If the UE connects via CSG access, it receives a greater QoS than those connected via public level access.

Thus, the UE, serving and target basestations and MME all cooperate to ensure that only UEs with the correct access rights are allowed to connect to a target basestation, and determine what QoS the UE receives when connecting to a hybrid basestation. This is achieved by the provision of the whitelist to both the UE and the MME, which allows the UE to confirm it is a member of a CSG for a CSG or hybrid basestation and for the MME to verify this before allowing the handover to take place.

The difference in QoS between CSG access and public level access for hybrid basestations can be significant. Thus, if an end user cannot connect to their own small cell via CSG access, their only options are to connect to nearby small cells via public access or to the macrocell. In these situations, the drop in QoS is large and frustrating for the end user.

It is therefore desirable to alleviate some or all of the above problems.

SUMMARY

According to a first aspect of the disclosure, there is provided a method in a cellular communications network, the method comprising: a first basestation transmitting a first message including a Closed Subscriber Group (CSG) identifier; determining, for a User Equipment (UE) whether the CSG identifier is present on a first allowed CSG list; determining the allowed service level for the UE, the allowed service level indicating one of at least a first and second allowed service level; and connecting the UE to the first basestation if the CSG identifier is present on the first allowed CSG list, wherein the Quality of Service (QoS) for the UE is dependent on the allowed service level.

The present disclosure therefore allows basestations operating in closed or hybrid modes of operation to offer differentiated levels of service to different CSG users. Thus a hybrid basestation may offer a first service level to a first group of CSG users, a second service level to a second group of CSG users, and a third service level to other (i.e. public) users. This is particularly beneficial for extensive small cell deployments, such that a small cell in a first user's home is configured to offer a first service level to a first group of CSG users (e.g. the first group of CSG users residing in the same premises as the small cell), a second service level to a second group of CSG users (e.g. the second group of CSG users residing in neighboring premises to the small cell), and a third service level to all other users (e.g. public users). In this example scenario, the second group of users usually connect via their own small cell. However, when their own small cell develops a fault condition or suffers from poor connectivity for any other reason, the second group of CSG users may connect to the first user's small cell instead, and only suffer a relatively small drop in service level compared to using public access (or that offered by the macrocell).

An additional benefit of the present disclosure is that is becomes less important for the coverage areas of small cells to cover the whole of the customer's premises, as the users residing in the same premises of the small cell may enjoy the second service level from their neighbor's small cell rather than the level provided for public access. Accordingly, the size of the coverage areas of small cells can be restricted (which improves performance), and users can still get a level of prioritized access in areas where they expect priority, but not necessary from their own small cell.

The method may further comprise: a User Equipment (UE) receiving the first message, wherein the UE stores a first copy of the first allowed CSG list and determines whether the CSG identifier is present on the first copy of the first allowed CSG list. Furthermore, a network management entity may store a second copy of the first allowed CSG list, and the method may further comprise: the network management entity determining whether the CSG identifier is present on the second copy of the first allowed CSG list, wherein the UE connects to the first basestation if the CSG identifier is present on the first and second copies of the first allowed CSG list. Accordingly, the UE may perform an initial check to determine if it is a member of the CSG associated with the CSG identifier broadcast by a basestation. This may then be confirmed by the network management entity, which stores a second copy of the first allowed CSG list. The first and second copies of the first allowed CSG lists may be updated by a Home Subscriber Server.

The method may further comprise: the UE sending a handover initiating message to a second basestation, the handover initiating message including the CSG identifier for the first basestation and a UE identifier; the network management entity receiving the CSG identifier and the UE identifier from the second basestation; and the network management entity retrieving the second copy of the first allowed CSG list based on the UE identifier. Accordingly, the network management entity may store a plurality of allowed CSG lists, each for a particular UE, and may then retrieve the relevant CSG list using the UE identifier before making a determination on whether the CSG list contains the CSG identifier.

The method may further comprise: determining whether the CSG identifier is present on a second allowed CSG list for the UE, wherein the allowed service level is determined by the CSG identifier being present on the corresponding first or second allowed CSG list, and the UE connects to the first basestation if the CSG identifier is present on one of the first and second allowed CSG lists. In this manner, a first service level may be determined by the CSG identifier's presence on the first allowed CSG list, and a second service level may be determined by the CSG identifier's presence on the second allowed CSG list. Alternatively, the first allowed CSG list may indicate the service priority level, such that only a single CSG list is required. Both the UE and the MME may store a first and second copy of the second allowed CSG list, respectively.

A non-transitory computer-readable storage medium is also provided, storing a computer program or suite of computer programs which upon execution by a computer system performs the method of the first aspect of the disclosure.

According to a second aspect of the disclosure, there is provided a User Equipment (UE) for a cellular communications network, the UE comprising: a memory module adapted to store a database including a first allowed Closed Subscriber Group (CSG) list including at least one CSG identifier for an CSG, and an allowed service level for each CSG identifier indicating one of at least a first and second allowed service level.

The UE may further comprise a transceiver adapted to receive a first message from a first basestation, the first message including a CSG identifier; and a processor adapted to determine whether the CSG identifier in the first message is present in the first allowed CSG list, and to determine the allowed service level for the CSG identifier in the first message.

The processor may be further adapted to cause the UE to connect to the first basestation if the CSG identifier is present on the first allowed CSG list, wherein the Quality of Service for the connection is dependent on the allowed service level.

The transceiver may be further adapted to send a handover initiating message to a second basestation, the handover initiating message including the CSG identifier and a UE identifier.

The database may further include a second allowed CSG list, wherein the allowed service level for each CSG identifier is indicated by its presence on one of the first and second allowed CSG lists, and the processor may be further adapted to cause the UE to connect to the first basestation if the CSG identifier is present on one of the first and second allowed CSG lists.

According to a third aspect of the disclosure, there is provided a basestation for a cellular communications network, the basestation comprising: a memory module adapted to store a first Closed Subscriber Group (CSG) identifier; a transceiver adapted to transmit the first CSG identifier and to receive a handover request message for a UE, the handover request message indicating that the UE is a CSG member and an allowed service level for the UE being one of at least a first and second allowed service level; and a processor adapted to connect the basestation and the UE, wherein the Quality of Service (QoS) for the UE is dependent on the allowed service level.

The handover request message may further indicate a second CSG identifier, and the processor may be further adapted to determine if the first and second CSG identifiers are the same. Thus, the second CSG identifier (which may be part of the handover request message from the Mobility Management Entity, which was initially transmitted from the UE) may be compared to the first CSG identifier (transmitted by the basestation) to confirm that the two are identical. This allows the basestation to confirm that the UE is part of that CSG.

According to a fourth aspect of the disclosure, there is provided a network management entity for a cellular communications network, the network management entity comprising: a transceiver adapted to receive a handover initiating message from a serving basestation, the handover initiating message including a Closed Subscriber Group (CSG) identifier and a UE identifier; a memory module having a database to store a first CSG list for a UE, the first CSG list including at least one CSG identifier, and an allowed service level for each CSG identifier indicating one of at least a first and second allowed service level; and a processor adapted to retrieve the first CSG list for the UE using the UE identifier, to determine whether the CSG identifier is present on the first CSG list for the UE, and to determine the allowed service level for the UE.

The transceiver may be further adapted to transmit a handover request message to a target basestation, the handover request message including the CSG identifier and the allowed service level.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

A first embodiment of a cellular communications network 1 will now be described with reference to FIGS. 1 to 4. The cellular communications network 1 comprises an evolved Node B basestation 10 (hereinafter, the "eNB") having a first coverage area, a Home evolved Node B basestation 20 (hereinafter, the "femtocell") having a second coverage area, a User Equipment (UE) 30, a Mobile Management Entity (MME) 40 and a Home Subscriber Server (HSS) 50. The eNB 10, femtocell 20 and UE 30 are all configured to communicate with each wirelessly, which, in this embodiment, is via the Long Term Evolution (LTE) $4^{th}$ Generation protocol. The eNB 10 and the femtocell 20 are further configured to communicate with each other over their respective backhaul links (i.e. via an X2 interface), and the MME is configured to communicate with the eNB 10 and femtocell 20 over a data connection (i.e. via an S1 interface) and with the HSS over a data connection (i.e. via an S6a interface).

Figure 1:
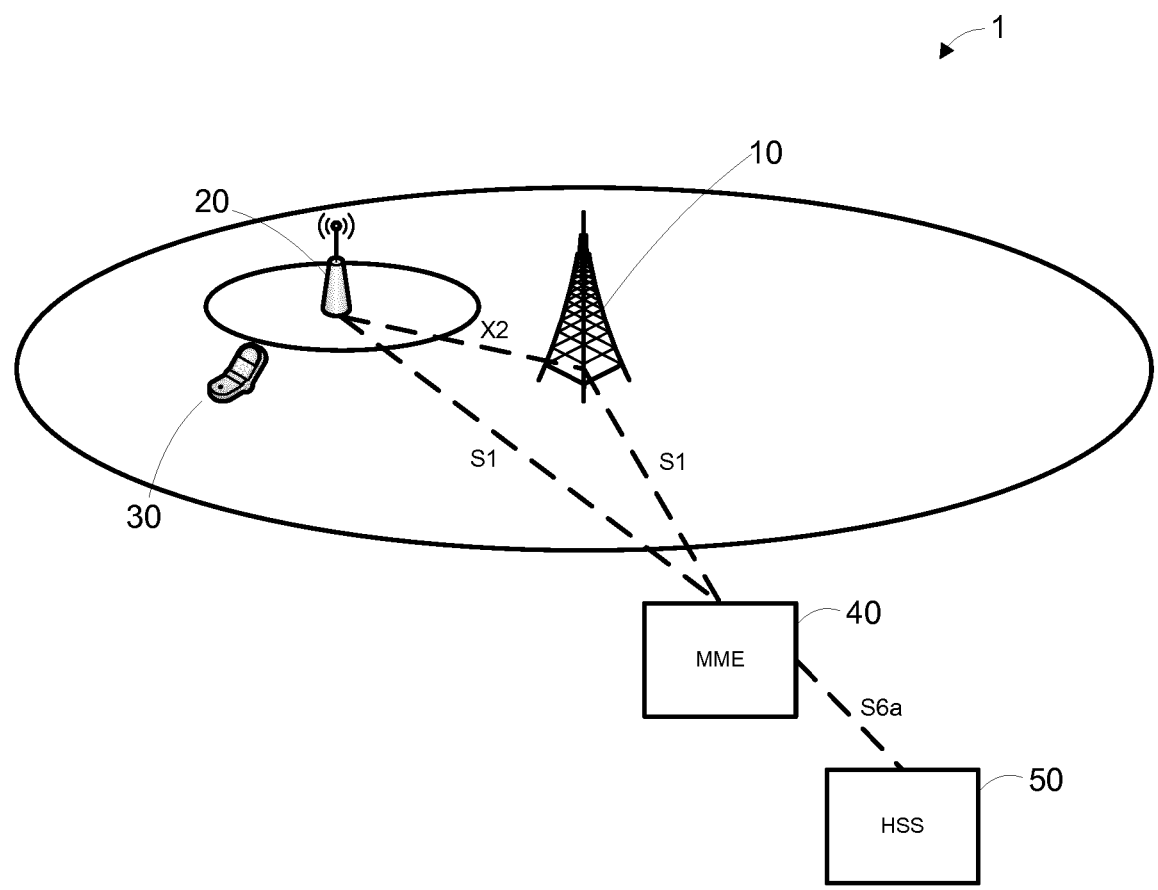
FIG. 1 is a schematic diagram of a first embodiment of a cellular communications network of the present disclosure, including an evolved Node B basestation, a Home evolved Node B basestation, a User Equipment and a Mobile Management Entity.
Figure 2A:
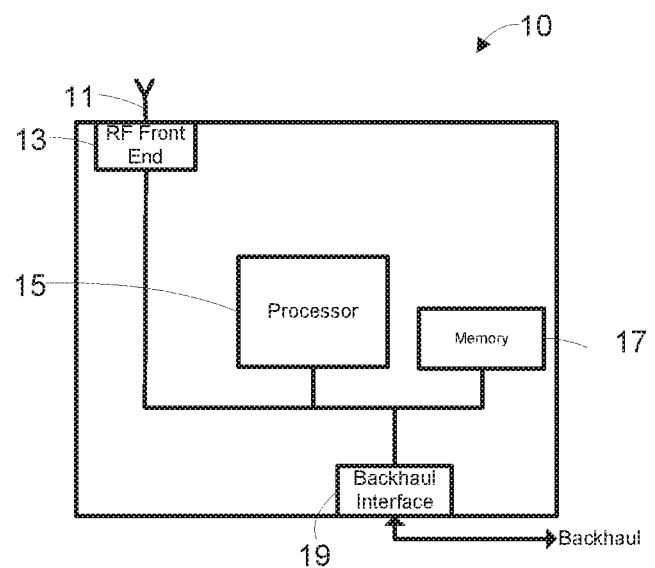
FIG. 2a is a schematic diagram of the evolved Node B basestation of FIG. 1.
Figure 2B:
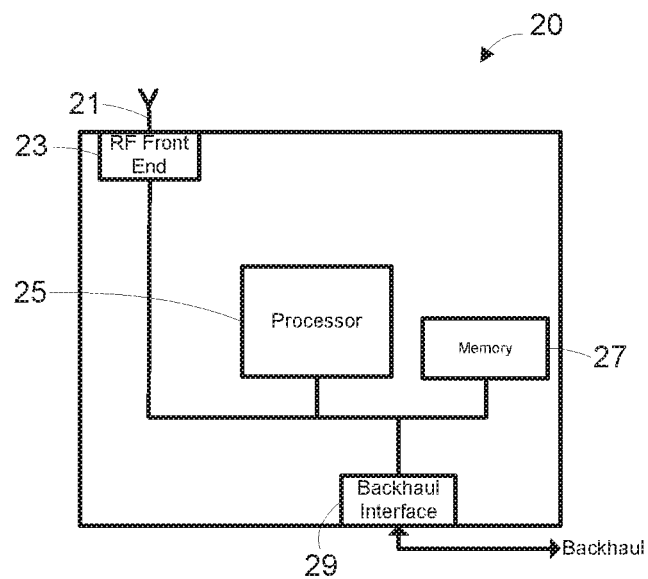
FIG. 2b is a schematic diagram of the Home evolved Node B basestation of FIG. 1.

A schematic diagram of the eNB 10 is shown in FIG. 2a. The eNB 10 includes an antenna 11 and RF front end 13, which together form a transceiver for sending and receiving transmissions with other wireless entities (such as the UE 30), and a backhaul interface 19, which is typically used for onward connection to external networks (such as the Internet) but also to connect the eNB 10 with other entities in the cellular communications network 1 (such as the MME 40). The eNB 10 also includes a processor 15 and memory 17. The memory 17 stores a Closed Subscriber Group (CSG) identifier, which is a unique identifier for a particular CSG (which acts as an access control list such that only a particular UE or subset of UEs may connect to a basestation associated with that CSG). The skilled person will understand that the femtocell 20 (shown in FIG. 2b) has a similar construction, including an antenna 21, RF front end 23, processor 25, memory 27 and backhaul interface 29.

Figure 3:
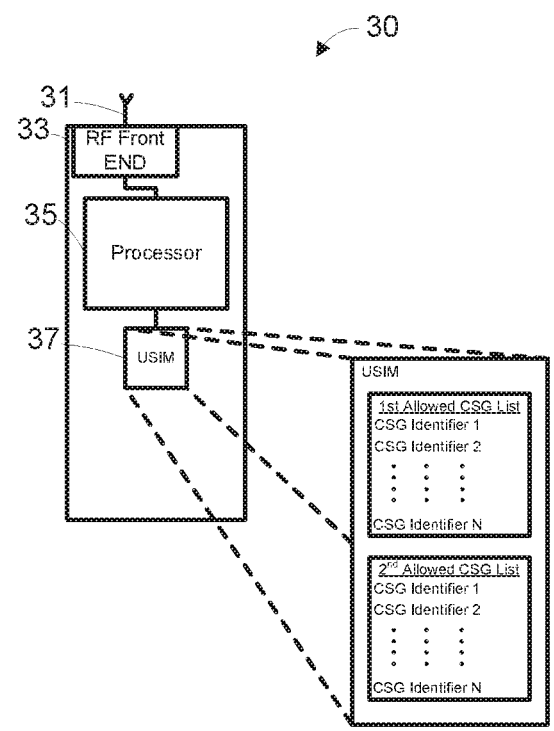
FIG. 3 is a schematic diagram of the UE of FIG. 1.

A schematic diagram of a UE 30 is shown in FIG. 3. The UE 30 also includes antenna 31 and RF front end 33, with together form a transceiver for sending and receiving transmissions with other wireless entities (such as the eNB 10 and femtocell 20). The UE 30 also includes a processor 35 and memory 37. In this embodiment, the memory 37 is part of the Universal Subscriber Identity Module (USIM) and includes a database having a first and second allowed CSG list (hereinafter referred to as the "whitelist" and "bluelist," respectively). The whitelist and bluelist each include a list of CSG identifiers. The presence of a CSG identifier on either the whitelist or bluelist indicates that the UE 30 is a member of the associated CSG and may therefore connect to any basestation associated with that CSG. Furthermore, the presence of the CSG identifier on the whitelist indicates that the UE 30 is a member of the associated CSG with a first service priority level and the presence of the CSG identifier on the bluelist indicates that the UE 30 is a member of the associated CSG with a second service priority level. These priority levels will become clear to the reader on review of the method of the present disclosure.

Figure 4:
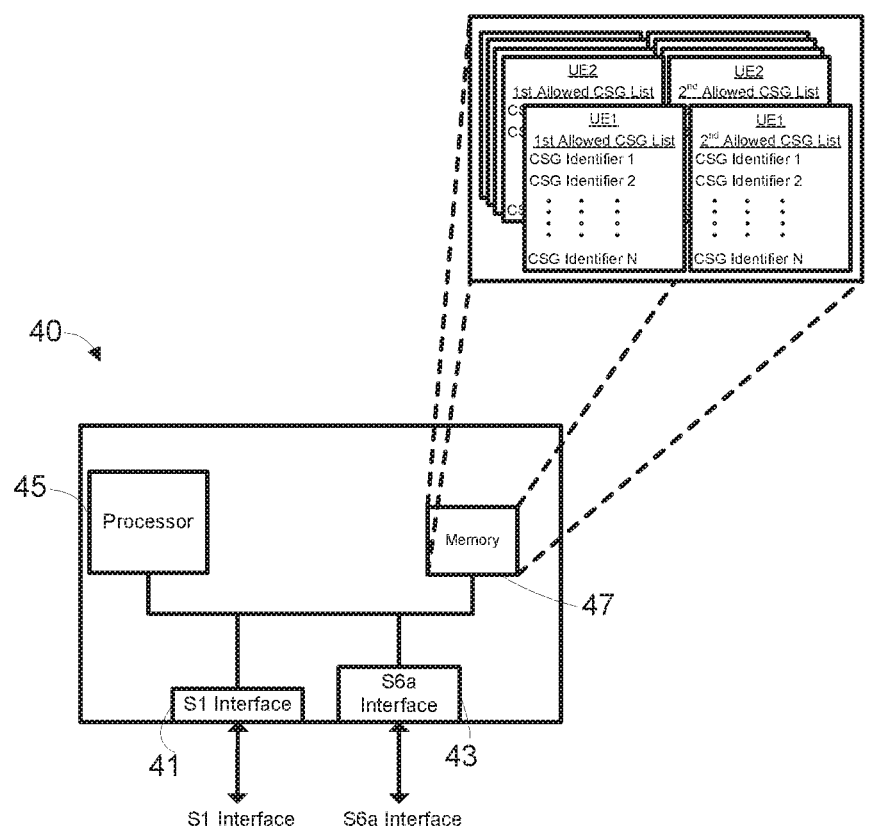
FIG. 4 is a schematic diagram of the Mobile Management Entity of FIG. 1.

A schematic diagram of the MME 40 is shown in FIG. 4. The MME 40 includes an S1 interface connection 41, which is adapted to transmit and receive S1 interface signals (e.g. with the eNB 10 or femtocell 20) and an S6a interface connection 43, which is adapted to transmit and receive S6a interface signals (e.g. with the HSS 50). The MME 40 also includes a processor 45 and memory 47. In this embodiment, the memory 47 includes a database comprising first and second allowed CSG lists (again, "whitelist" and "bluelist," respectively) for each UE (such as UE 30, but also any other UE in the cellular communications network 1), each containing a list of CSG identifiers. Again, the presence of a CSG identifier on either the whitelist or bluelist for the UE 30 indicates that the UE 30 is a member of the associated CSG. In particular, the presence of the CSG identifier on the whitelist for UE 30 indicates that the UE 30 is a member of the associated CSG with a first service priority level and the presence of the CSG identifier on the bluelist indicates that the UE 30 is a member of the associated CSG with a second service priority level.

The HSS 50 is a centralized management entity having a database storing a list of CSG identifiers (i.e. a CSG identifier for each CSG), the basestation(s) associated with each CSG, and a whitelist and bluelist for each UE in the cellular communications network 1. These may be configured by the Network Operator. The HSS 50 is configured to update the CSG identifier stored in memory on the eNB 10 and femtocell 20, the list of CSG identifiers stored in the whitelist and bluelist on each UE 30, and the list of CSG identifiers stored in each whitelist and bluelist for each UE on the MME 40.

Figure 5A:
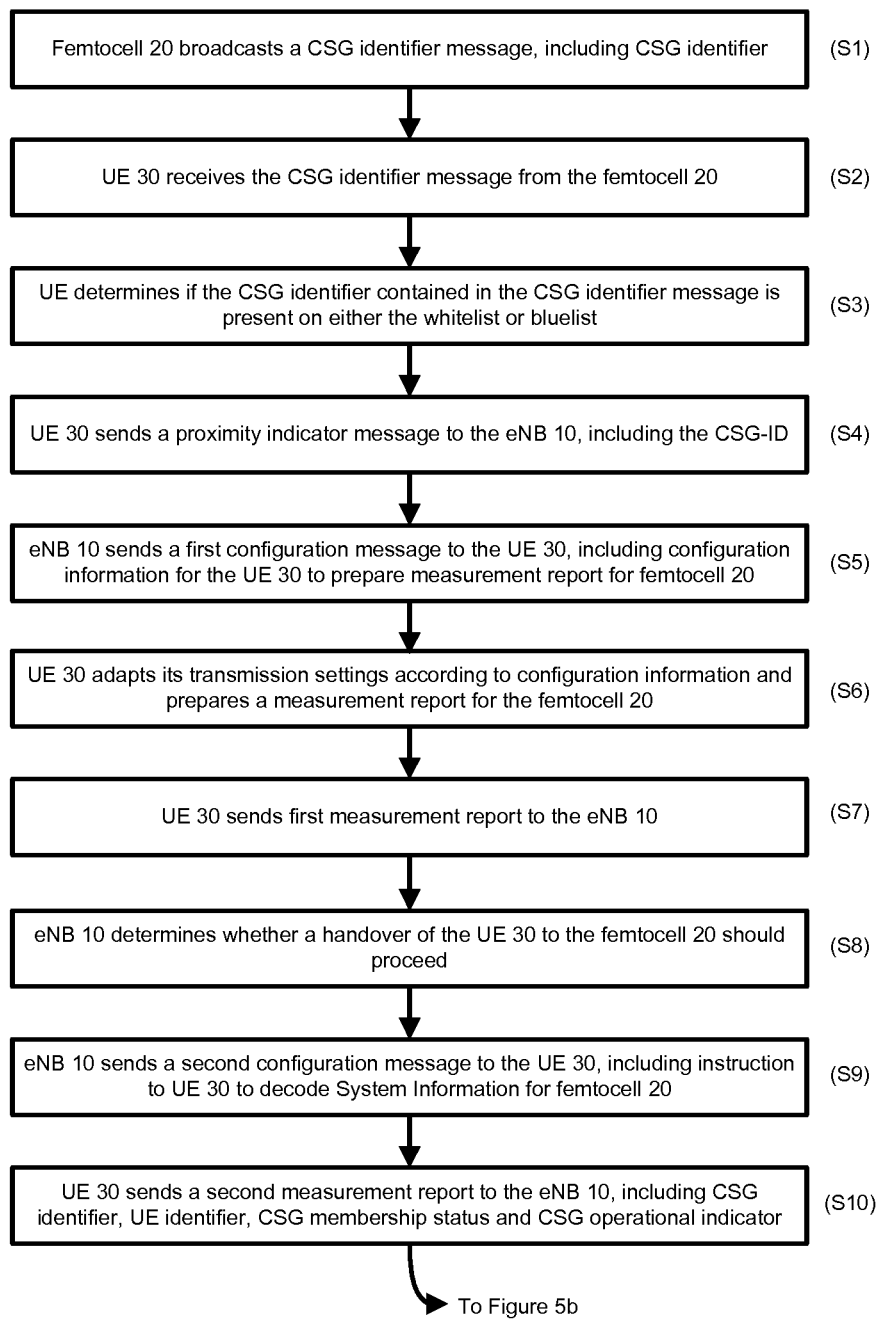
FIGS. 5a and 5b show a first and second part of a flow diagram, respectively, the flow diagram illustrating a first embodiment of the present disclosure.
Figure 5B:
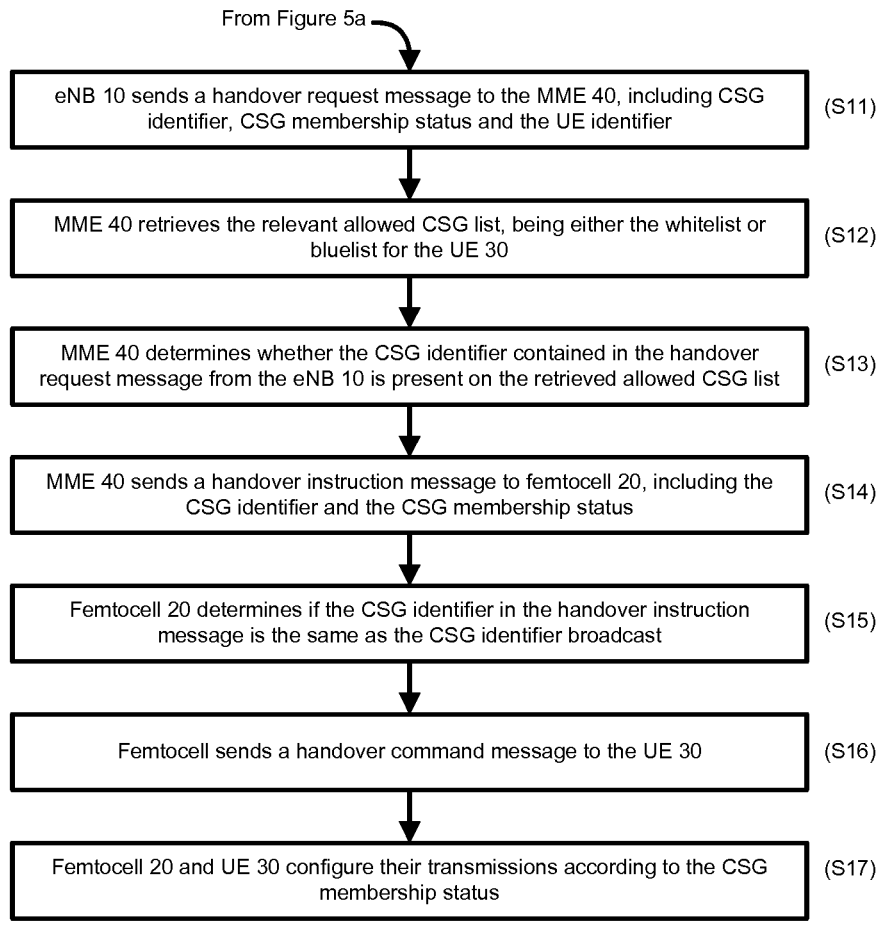
Figure 6:
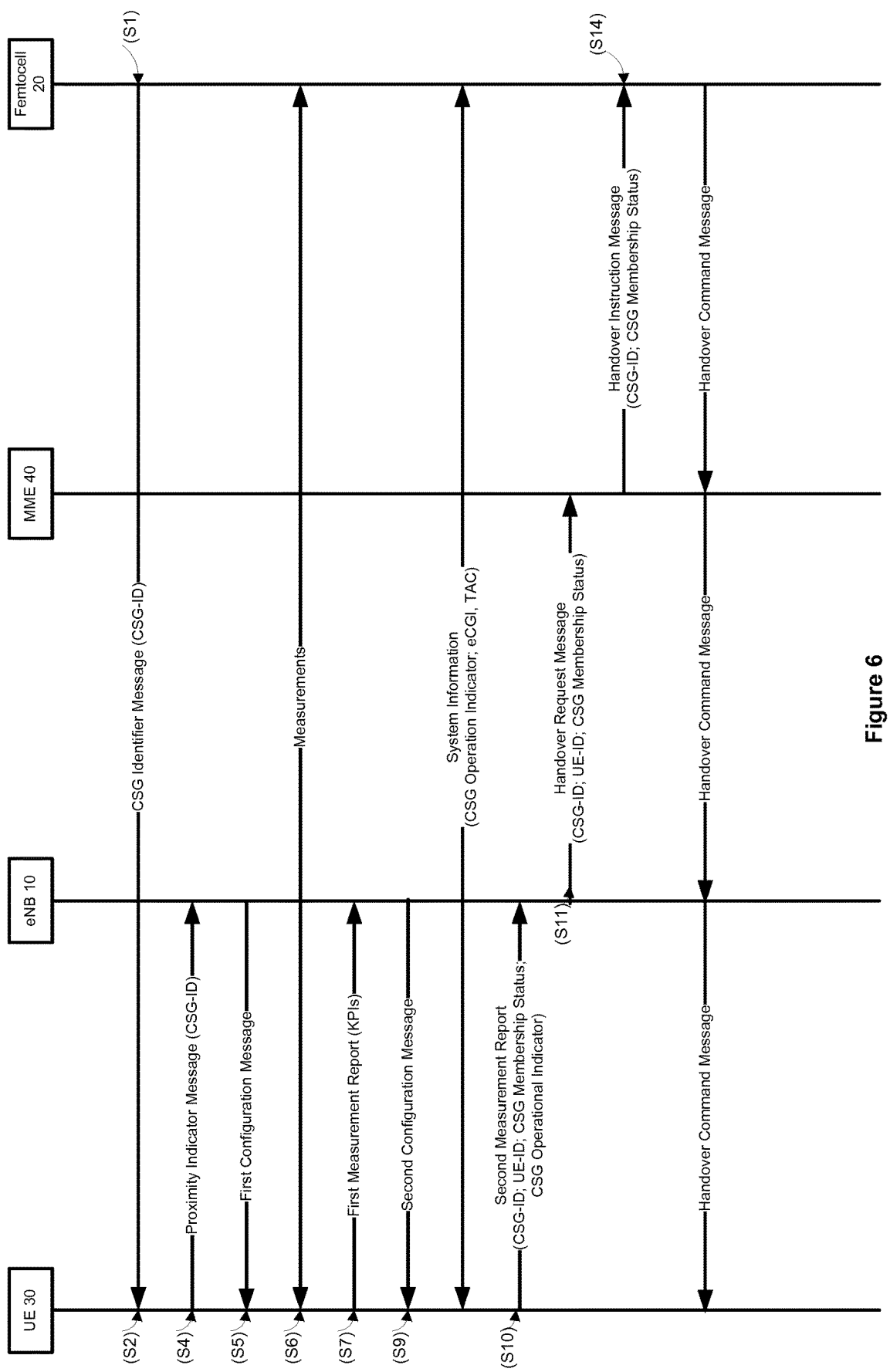
FIG. 6 is a swim lane chart illustrating the message flows of the method of FIGS. 5a and 5b.

The various processing and memory modules of the eNB 10, femtocell 20, UE 30, and MME 40 are all configured to implement a method of the present disclosure. An embodiment of the present disclosure will now be described with reference to FIGS. 5a, 5b and 6 (wherein FIGS. 5a and 5b form a flowchart illustrating the method and FIG. 6 is a swim lane chart illustrating the various messages used in the method).

In S1, the femtocell 20 broadcasts a CSG identifier message. The CSG identifier message is compiled by the processor 25 and includes the CSG identifier stored on memory module 27. The CSG identifier message is broadcast by the antenna 21 (via RF front end 23).

The UE 30 performs proximity detection operations, in which it processes RF signals received at antenna 31 via RF front end 33 in order to determine whether it is in the proximity of an evolved Node B basestation configured for CSG access. In this embodiment, the UE 30 is initially in the coverage area of and connected to the eNB 10 (i.e. the eNB 10 is the UE's 30 serving basestation) but roams into the coverage area of femtocell 20. Accordingly, in S2, the UE 30 receives the CSG identifier message from the femtocell 20.

In response (in S3), the UE 30 determines if the CSG identifier contained in the CSG identifier message is present on either its whitelist or bluelist stored on memory module 37. Accordingly, the CSG identifier message is decoded by the RF front end 23 and processor 25, and the processor 25 performs a look up operation to determine whether the CSG identifier contained in the CSG identifier message is present on either the whitelist or bluelist. In this embodiment, the CSG identifier message is present on one of the whitelist or bluelist. Thus, in S4, the UE 30 sends a proximity indicator message to its serving basestation, the eNB 10, including the CSG-ID.

In S5, the eNB 10 sends a first configuration message to the UE 30, which includes the relevant configuration information for the UE 30 to prepare a measurement report of the femtocell 20 (the eNB 10 thus stores the relevant configuration information for a plurality of basestations in memory 17). In response, in S6, the UE 30 adapts its transmission settings according to the configuration information and prepares a measurement report for the femtocell 20. In S7, the UE 30 sends a first measurement report to the eNB 10.

In S8 the eNB 10 determines whether a handover of the UE 30 to the femtocell 20 is viable. This is well known in the art, this typically comprises the eNB 10 determining if a number of Key Performance Indicators (KPIs), determined from the first measurement report, meet one or more predetermined thresholds (set by the Network Operator). In this embodiment, the eNB 10 determines that the handover shall proceed based on these criteria. Accordingly, in S9, the eNB 10 sends a second configuration message to the UE 30, which includes an instruction for the UE 30 to decode the System Information for femtocell 20.

On receipt of the second configuration message, the UE 30 decodes the System Information of the femtocell 20. The UE 30 therefore determines the following information of the femtocell 20:

the CSG operational indicator (being either TRUE or FALSE); and the femtocell's 20 E-UTRAN Cell Global Identifier (eCGI) and Tracking Area Code (TAC).

The CSG operational indicator indicates to the UE 30 whether the femtocell 20 is operating in closed or hybrid mode. That is, if the femtocell 20 is operating in closed mode, the CSG operational indicator is TRUE. However, if the femtocell 20 is operating in hybrid mode, the CSG operational indicator is FALSE. The skilled person will understand that the femtocell 20 cannot be operating in open mode (even if the CSG operational indicator is FALSE) as it is also broadcasting its CSG identifier. The eCGI and TAC are used to uniquely identify the femtocell 20.

In S10, the UE 30 sends a second measurement report message to the eNB 10, including a CSG identifier, a UE identifier (i.e. the International Mobile Subscriber Identity, IMSI), a CSG membership status and the CSG operational indicator. The CSG membership status differs to that used in the prior art as it indicates not only whether the CSG identifier is present on an allowed CSG list on the UE 30, but, in this embodiment, whether it is present on the whitelist or bluelist on the UE 30. In this embodiment, the CSG identifier is present on one of the whitelist or bluelist (both options will be described below). Accordingly, the eNB 10 sends a handover request message to the MME 40, including the CSG identifier, the CSG membership status and the UE identifier (S11).

In S12, the MME 40 retrieves the relevant allowed CSG list from memory 47. The relevant allowed CSG list will be one of the whitelist or bluelist for the UE 30, which is identified by the UE identifier (which identifies the whitelist and bluelist associated with that UE) and the CSG membership status (which indicates whether to retrieve the whitelist or the bluelist of those associated with that UE). In S13, the MME 40 determines whether the CSG identifier contained in the handover request message from the eNB 10 is present on its locally retrieved whitelist or bluelist. As these are separate copies of the lists and are updated by the HSS 50, the MME 40 effectively performs a verification step to confirm that the UE 30 is a member of that CSG. Furthermore, the verification step confirms that the CSG identifier is present on the correct list (i.e. the whitelist or the bluelist).

In this embodiment, the MME 40 confirms that the CSG identifier is present on the correct list. Accordingly, the MME 40 sends a handover instruction message to the femtocell 20, confirming that the handover can now take place (S14). The handover instruction message includes the CSG identifier and the CSG membership status (indicating whether the CSG identifier was present on the whitelist or bluelist on the UE 30 and on the corresponding entry on the MME 40). In S15, the femtocell 20 determines if the CSG identifier in the handover instruction message is the same as the CSG identifier broadcast in 51. This is a further verification step to confirm that the UE 30 hasn't modified the CSG identifier in order to illicitly connect to the femtocell 20. Once verified, the femtocell 20 sends a handover command message to the UE 30 (via the MME 40 and eNB 10), which causes the UE 30 to connect to the femtocell 20 (S16).

In S17, the femtocell 20 and UE 30 configure their transmissions according to the CSG membership status. Accordingly, if the CSG membership status indicates that the CSG identifier transmitted by the femtocell 20 was present on the whitelist for the UE 30 (i.e. on both the UE 30 and the MME 40), then the femtocell 20 and UE 30 configure their transmissions according to a first (relatively high) service level; whereas if the CSG membership status indicates that the CSG identifier was present on the bluelist for the UE 30, then the femtocell 20 and UE 30 configure their transmissions according to a second (relatively low) service level. In this embodiment, the service level between the femtocell 20 and UE 30 is enforced by modifying the RACH and RRC mode parameters by differential allocation of time slots for RACH and differential traffic queue management and scheduling priority depending on the service level (for example, the first (relatively high) service level is enforced by allocating a greater number of time slots than for the second (relatively low) service level).

In the embodiment above, the UE 30 decodes the System Information to determine the CSG operational indicator of the femtocell 20. This indicates TRUE if the femtocell 20 is operating in closed mode or FALSE if the femtocell 20 is operating in hybrid mode. The skilled person will understand that the method tasks following this determination are not altered either way. However, if the femtocell 20 is operating in hybrid mode, then any UE may also connect to the femtocell 20 via public access. In this embodiment, the femtocell 20 is adapted to offer a third service level to such UEs, which is lower than the second service level for UEs having the femtocell's 20 broadcast CSG identifier on their bluelist.

In the above embodiment, the UE 30 stores a first and second allowed CSG list and the MME 40 stores a first and second allowed CSG list for each UE. However, the skilled person will understand that this is not the only way of realizing the advantages of the present disclosure. For example, the UE 30 may store a single allowed CSG list, indicating not only a CSG identifier for each CSG the UE is a member of, but also indicating the service priority level for the UE for each CSG. The CSG membership status may then indicate that the UE is a member of the CSG, and also the service priority level for the UE for that CSG. The MME 40 may also store a corresponding single allowed CSG list for each UE to be used in the verification step, and the femtocell 20 may be configured to adapt its service level for the UE 30 depending on the indicated service priority level indicated in the CSG membership status.

Furthermore, the skilled person will understand that the present disclosure may differentiate between any number of service level priorities for UEs being a member of a CSG, and a basestation and UE may then configure their transmissions according to that service level priority.

The above embodiment is described with reference to the 4G LTE protocol. However, the skilled person will understand that the method of the present disclosure may be applied to any past, present or future cellular communications protocol (either as a completely new addition or as a modification of existing CSG techniques).

In the above embodiment, processing modules of the various entities are configured to carry out the method of the present disclosure. The skilled person will understand that these processing modules may each be a single module or a number of distinct modules.

The skilled person will understand that any combination of features is possible within the scope of the invention, as claimed.

The invention claimed is:

1. A method in a cellular communications network, the method comprising:
    transmitting, by a first basestation, a first message including a Closed Subscriber Group (CSG) identifier;
    determining for a User Equipment (UE) that the CSG identifier is present on a first allowed CSG list;
    determining an allowed CSG service priority level for the UE based on the CSG identifier, the allowed CSG service priority level being selected from the group consisting of a first CSG service level and a second CSG service level, the first CSG service priority level providing a different level of service than the second CSG service priority level; and
    connecting the UE to the first basestation, wherein the Quality of Service (QoS) for the UE is dependent on the allowed CSG service priority level.

2. A method as claimed in claim 1, further comprising:
    the UE receiving the first message,
    wherein the UE stores a first copy of the first allowed CSG list and determines that the CSG identifier is present on the first allowed CSG list.

3. A method as claimed in claim 2, wherein a network management entity stores a second copy of the first allowed CSG list, the method further comprising:
    the network management entity determining that the CSG identifier is present on the second copy of the first allowed CSG list.

4. A method as claimed in claim 3, further comprising:
    the UE sending a handover initiating message to a second basestation, the handover initiating message including the CSG identifier for the first basestation and a UE identifier; and
    the network management entity receiving the CSG identifier and the UE identifier from the second basestation;
    wherein the stored second copy of the first allowed CSG list was retrieved by the network management entity based on the UE identifier.

5. A method as claimed in claim 1, wherein, by determining that the CSG identifier is present on the first allowed CSG list, the allowed CSG service priority level of the UE is determined to be the first CSG service priority level.

6. A method as claimed in claim 1, wherein the first allowed CSG list indicates the allowed CSG service priority level.

7. A non-transitory computer-readable storage medium storing a computer program or suite of computer programs which, upon execution by a computer system, performs the method of claim 1.

* * * * *